Dec. 16, 1924.                                                      1,519,728
F. W. FUREN
AUTOMOBILE FUEL TANK
Filed Oct. 24, 1923
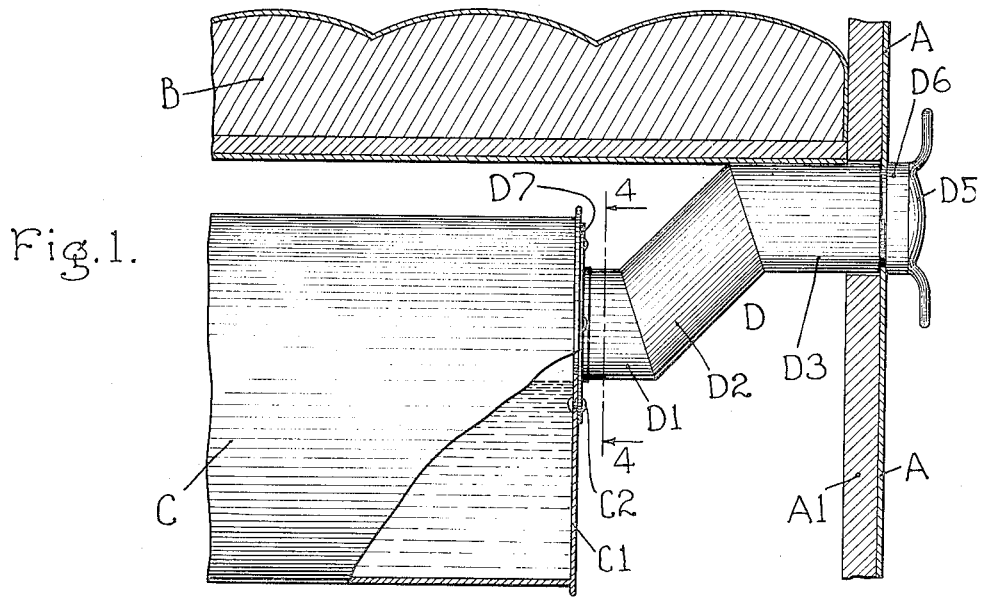
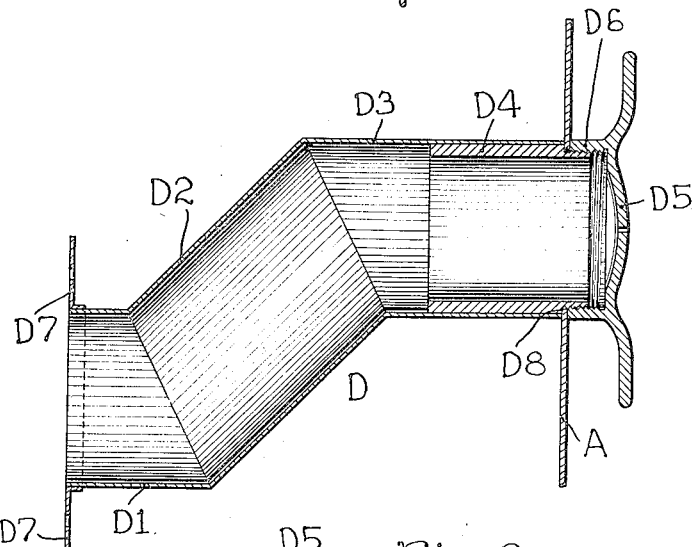
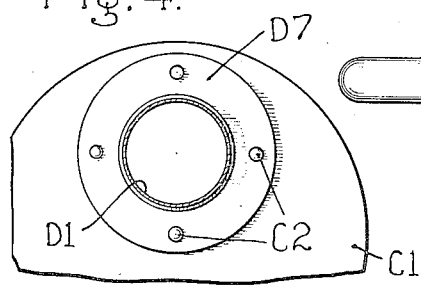

Patented Dec. 16, 1924.

1,519,728

UNITED STATES PATENT OFFICE.

FRED WILLIAM FUREN, OF ST. PETERSBURG, FLORIDA.

AUTOMOBILE FUEL TANK.

Application filed October 24, 1923. Serial No. 670,593.

*To all whom it may concern:*

Be it known that I, FRED WILLIAM FUREN, a citizen of the United States, residing at St. Petersburg, in the county of Pinellas and State of Florida, have invented a new and useful Improvement in Automobile Fuel Tanks, of which the following is a specification, reference being had to the accompanying drawing.

My improvement is particularly applicable to automobiles of the Ford type wherein the tank for gasoline or similar fuel is located under one of the seats of the automobile, the present practice being to remove the seat to afford access to the tank for the delivery of fuel liquid into the tank.

The object of the invention is to combine with said tank and the body of the automobile means whereby gasoline may be delivered in said tank through one of the outer side walls of the automobile and without the necessity of removing the seat under which the tank is located.

In the accompanying drawings,—

Fig. 1 is a transverse, upright section showing a part of one of the side walls and one of the seats of such an automobile and showing a part of the fuel tank and means for communication with the tank from the outer side of the automobile;

Fig. 2 is an upright section through the tubular structure which leads from the tank outward through the side wall;

Fig. 3 is an elevation of the removable cap which forms a part of the tubular structure;

Fig. 4 is an upright section on the line, 4—4, of Fig. 1, looking toward the left.

Referring to said drawings, A is the sheet metal part of one of the side walls of the automobile, and $A^1$ is a reinforcing part of said wall. B is one of the seats of the automobile. C is the fuel tank in fixed position below the seat. This tank is made of sheet metal and has an end wall, $C^1$.

D is the tubular structure leading from the tank outward through the wall, A. This structure comprises a horizontal section, $D^1$, an oblique, upright-directed section, $D^2$, an upper horizontal section, $D^3$, a neck, $D^4$, a cap, $D^5$, and a ring-form collar, $D^7$, surrounding and secured to the tubular section, $D^1$, and resting flatwise against the end wall, $C^1$, of the tank, C, and secured thereto by solder and rivets, $C^2$. Said collar and the sections, $D^1$, $D^2$ and $D^3$, are preferably formed of sheet metal; and their diameter is to be sufficient to permit the insertion of a nozzle through which gasoline and similar liquid fluid is to be delivered.

The oblique section, $D^2$, is used to bring the inlet of this tubular structure higher than the section, $D^1$.

The throat piece, $D^4$, may be a piece of ordinary metal piping of ample strength or rigidity and fitting against the interior of the section, $D^3$, and soldered thereto. The outer end of the throat piece, $D^4$, is reduced and exteriorly screw threaded to form a shoulder, $D^8$, which is even with the outer end of the tubular section, $D^3$, and bears against the inner face of the automobile side wall, A. The cap, $D^5$, has a neck, $D^6$, which is interiorly screw threaded to engage the exterior screw threading on the throat piece, $D^4$. Said cap may be turned for driving it forward toward the wall, A, until it bears against said wall and binds the latter between the shoulder, $D^8$, and the inner edge of the neck, $D^6$, the outer end of the tubular structure being thus firmly supported by the automobile wall, the strong throat piece giving strength to the relatively weak sheet metal section, $D^3$.

It is to be observed that all of the tubular structure excepting the cap, $D^5$, is hidden from view by the wall, A. Hence all of these parts excepting the cap may be of any convenient external finish. The exterior of the cap may be metal-plated or enameled or painted. Some automobile owners will desire to have this cap provided with the same surface finish as is given to the exterior of the side wall, A, in order that said cap will not be conspicuous.

When gasoline or other liquid fuel is to be delivered into the tank, the cap, $D^5$, is removed. Then a nozzle communicating with a source of liquid fuel supply is inserted into the outer part of the tubular structure and the liquid fuel caused to flow through said nozzle and through the tubular structure into the tank, this being done without being put to the trouble and inconvenience of removing and afterward replacing the seat, B.

I claim as my invention,—

1. In an automobile, the combination with a side wall and a seat and a stationary tank located under the seat, of a relatively weak sheet metal tubular structure joined to and communicating with the tank and leading thence upward and outward through the side wall, said tubular structure comprising a horizontal section attached to a tank, an oblique section attached to said horizontal section, an upper horizontal section attached to said oblique section, a throat piece in the upper section to give strength to said section, and a cap on said throat piece, substantially as described.

2. In an automobile, the combination with a side wall and a seat and a stationary tank located under the seat of a relatively weak sheet metal tubular structure joined to and communicating with the tank and leading thence upward and outward through the side wall, a throat piece to give strength to the outer end of the tubular structure having a shoulder bearing against the inner face of the side wall, and a cap engaging the throat piece and bearing against the outer face of the side wall, substantially as described.

In testimony whereof I have signed my name, this 17th day of October, in the year one thousand nine hundred and twenty-three.

FRED WILLIAM FUREN.